(12) United States Patent
Cheng et al.

(10) Patent No.: US 7,543,504 B1
(45) Date of Patent: Jun. 9, 2009

(54) FLUIDIC PIEZORESISTIVE STRAIN GAUGE

(75) Inventors: Ching-Hsiang Cheng, Kowloon (CN); Chen Chao, Kowloon (CN); Yin-Nee Cheung, Kowloon (CN)

(73) Assignee: The Hong Kong Polytechnic University, Kowloon (KR)

( * ) Notice: Subject to any disclaimer, the term of this patent is extended or adjusted under 35 U.S.C. 154(b) by 0 days.

(21) Appl. No.: 12/007,610

(22) Filed: Jan. 14, 2008

(51) Int. Cl.
*G01B 7/16* (2006.01)

(52) U.S. Cl. .......................................................... 73/777
(58) Field of Classification Search ..................... 73/777
See application file for complete search history.

(56) References Cited

U.S. PATENT DOCUMENTS

| | | | | |
|---|---|---|---|---|
| 3,662,313 | A | * | 5/1972 | Komatsu ..................... 338/90 |
| 4,708,019 | A | | 11/1987 | Rubner et al. |
| 4,717,253 | A | | 1/1988 | Pratt, Jr. |
| 6,761,073 | B2 | * | 7/2004 | Otobe et al. .................. 73/766 |
| 7,278,317 | B2 | | 10/2007 | Bessette et al. |

\* cited by examiner

*Primary Examiner*—Max Noori
(74) *Attorney, Agent, or Firm*—Kauth, Pomeroy, Peck & Bailey LLP

(57) ABSTRACT

The present invention relates to a strain gauge having a conductive fluid made of a glycerin/aqueous salt mixture, and methods of making the strain gauge. The strain gauge is capable of measuring large displacement of around 30% true strain.

6 Claims, 3 Drawing Sheets

FLUIDIC PIEZORESISTIVE STRAIN GAUGE

BACKGROUND

A strain gauge is a device for measuring dimensional change in a specimen. Electrical-type strain gauges are widely in use today and are based upon the measurement of a resistance change that is proportional to the strain. The principle of a resistance-type strain gauge can be illustrated with a conduction in rod shape. As the rod is elongated in response to tensile stress, the length of the rod increases when the basic resistivity of the material remains reasonably constant. The displacement is translated via a movement to a rotatable pointer that moves opposite a dial of calibrated pressure valves. Gauges displaying values in digital form often include an electronic pressure transducer, such as a piezo-type sensor, that generates an electrical signal in response to the pressure to which the transducer is exposed. The electrical signal is then converted to a symbol that is presented on the display. Traditional strain gauges are made of alloys such as copper-nickel alloy, nickel-chrome alloy, and platinum-8% tungsten, etc.

It is an object of the present invention to provide a fluidic strain gauge capable of high displacement measurement not recorded in the prior art.

DESCRIPTION

The present invention relates to a strain gauge having a conductive fluid made of a glycerin/aqueous salt mixture, and methods of making the strain gauge. The present gauge is useful in biomedical applications, for example in the measurement of large tissue deformation.

These and other features, aspects, and advantages of the invention and methods of making such will become better understood from the following description, appended claims, and accompanying drawings where:

The following description of certain exemplary embodiment(s) is merely exemplary in nature and is in no way intended to limit the invention, its application, or uses.

Figure 1:
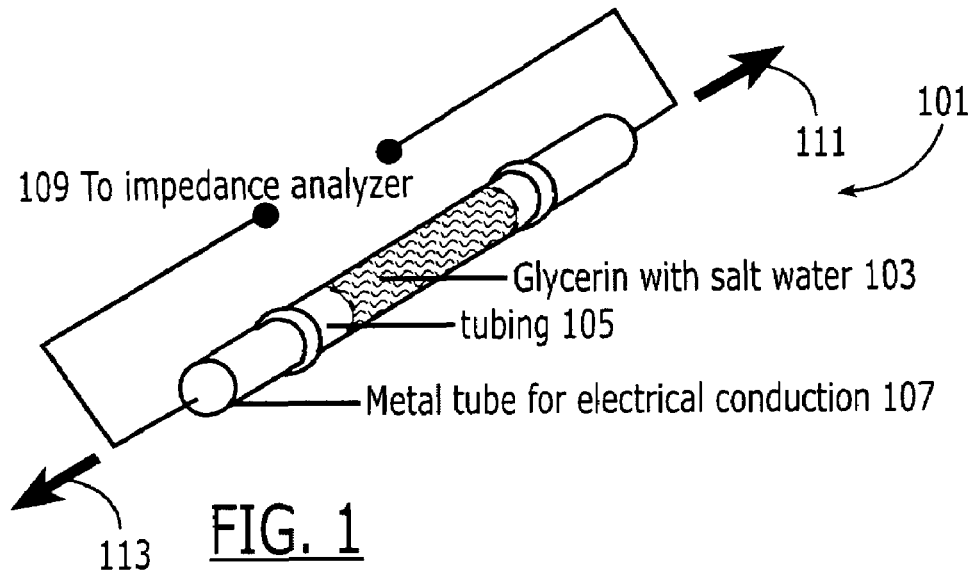
FIG. 1 shows an embodiment of a fluidic strain gauge of the present invention.

Now, to FIGS. 1-4,

FIG. 1 is an embodiment of a strain gauge 101 of the present invention, including a glycerin/aqueous salt mixture 103 serving as the fluid inside a polymer casing 105 to which it is attached, on either end of the casing 105, metal tubes 107. Leads 109 are connected to the metal tube 107 ends for feeding to an impedance analyzer for alternating current measurements.

The gauge length (length between two electrodes) of the casing 105 used in gauge 101 can range from 15 mm to 30 mm in length. The casing 105 can be circular, with a diameter of from about 1 mm to about 5 mm or any other suitable shape. The casing 105 can be made of a polymer material, such as an elastic or rubber-like polymer. The casing 105 is sealed at both ends to contain the glycerin mixture 103, and attached to metal tubes 107 on both ends.

The metal tubes 107 are attached to leads 109 and to a measuring instrument.

In use, tensile stress/displacement 111/113 is applied to both ends of the strain gauge 101. The gauge 101 is elongated, which results in a resistance increase. The resistance increase results in a electrical impedance change, exhibited by an attached impedance analyzer.

The glycerin/aqueous salt mixture 103 includes salt, water and glycerin. Salt may be used in an amount of from 0.5 to 1.5 parts, water in an amount of from 7 to 10 parts, and glycerin in an amount of from 2 to 4 parts. The salt can be sodium chloride or common salt; suitable water can be distilled water, deionized water, double distilled water, and the like.

Figure 2:
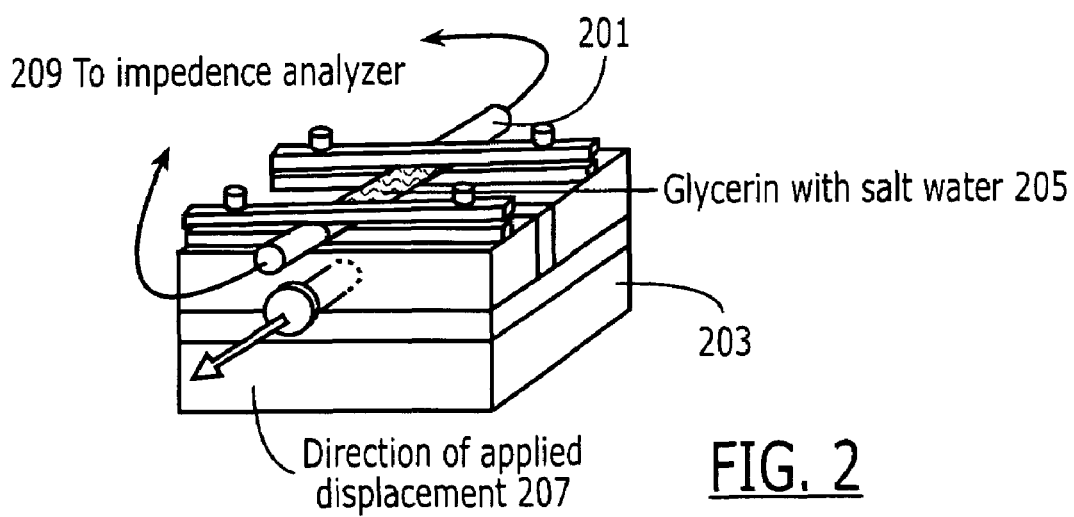
FIG. 2 shows the fluidic strain gauge embodiment on a displacement apparatus.

FIG. 2 is an embodiment of a strain gauge 201 of the present invention, positioned on a displacement apparatus 203.

As shown, the gauge 201 is attached to the displacement apparatus 203 at the two ends. The tubing contains the glycerin/aqueous salt mixture 205. Through leads, a measuring device 209 is connected to the gauge 201 via metal terminals. Tensile stress/displacement 207 is applied to the gauge 201, and the electrical impedance change measured.

Figure 3:
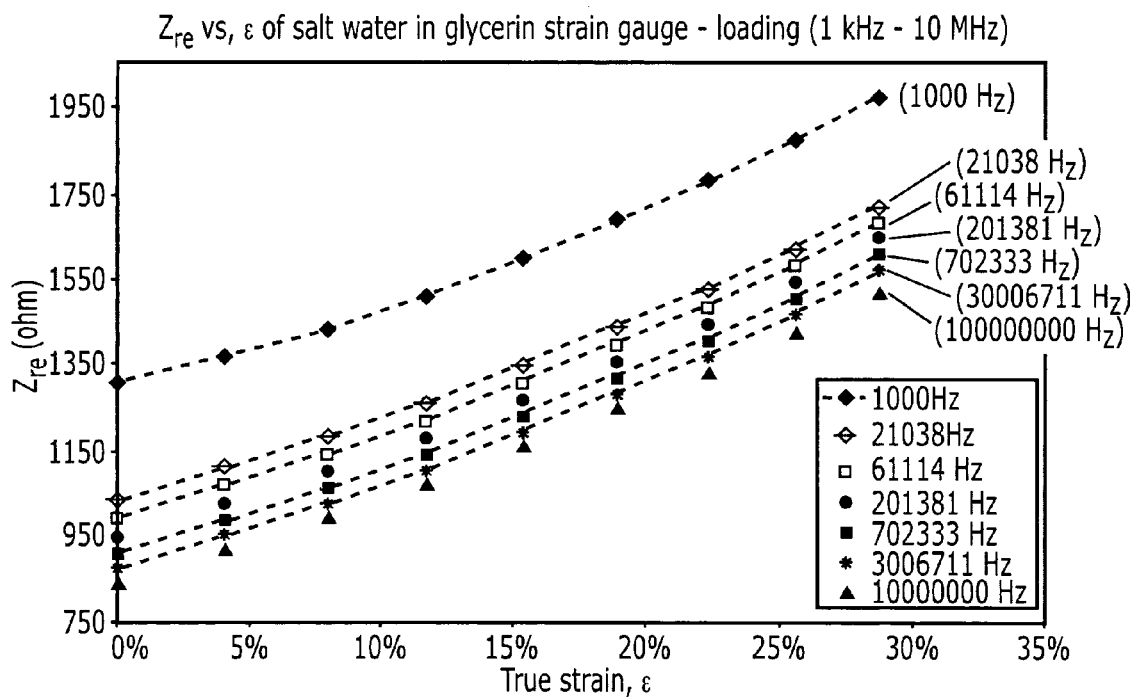
FIG. 3 shows the results of the present fluidic strain gauge impedance measurements at applied strains under a frequency range of 1 KHz-10 MHz.

FIG. 3 shows the variation between the real part of the impedance measured ($Z_{re}$) against true stain ($\epsilon$) applied at different frequencies (1 KHz-10 MHz) for an embodiment of the present strain gauge. A linear relationship between $Z_{re}$ and $\epsilon$ is obtained which shows linear strain sensitivity. As shown, the gauge is capable of measurements up to and beyond a 30% change in displacement.

Figure 4:
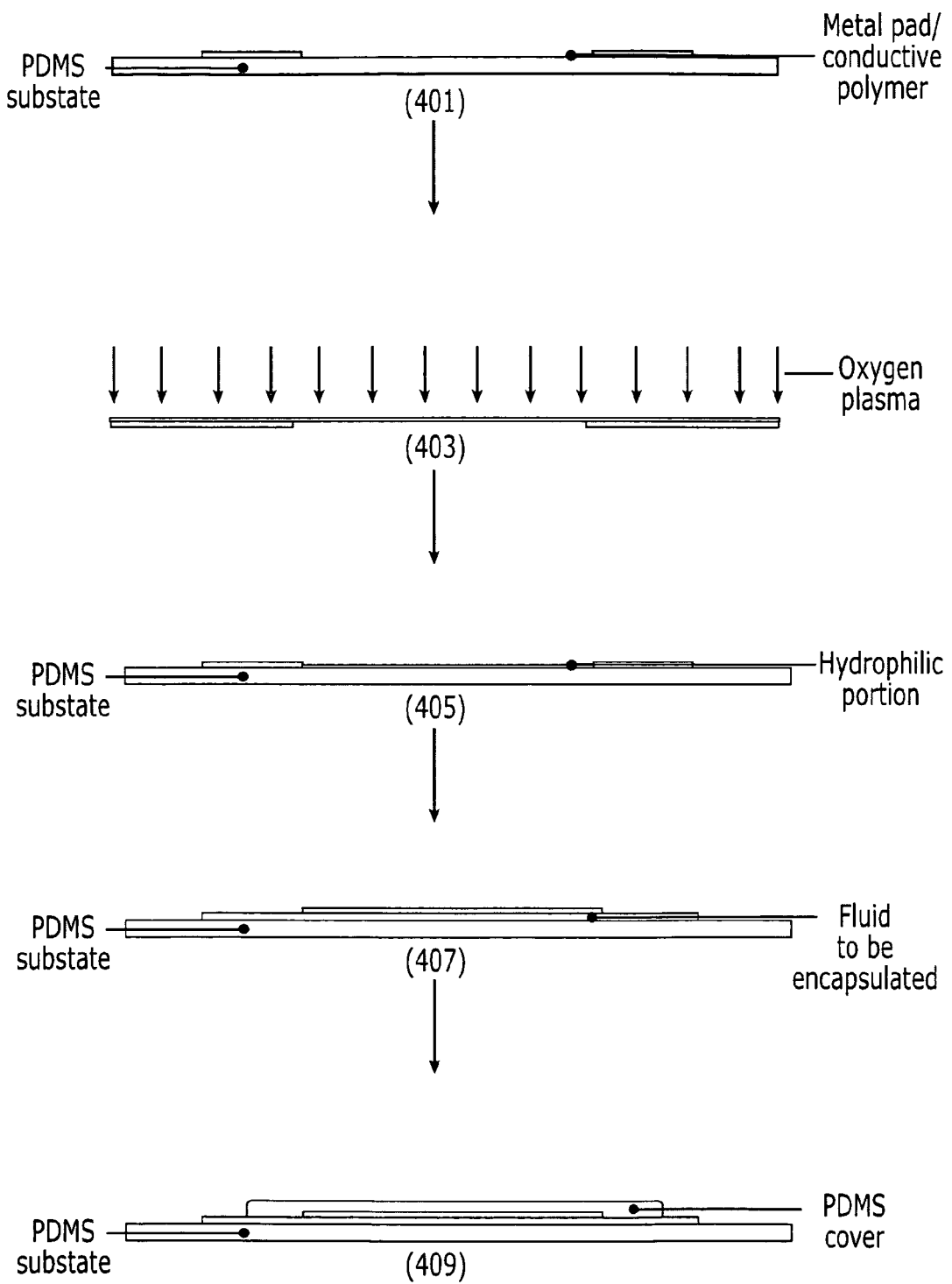
FIG. 4 shows a method of making the present fluidic strain gauge embodiment.

FIG. 4 is an embodiment of a method of making the present strain gauge.

Firstly, a metal pad, such as gold, or a conductive polymer pad is deposited on a polymer, for example for polydimethylsiloxane substrate 401. Oxygen plasma is then applied to the substrate for approximately 1 to 3 minutes 403, creating a hydrophilic layer with pattern 405. The conductive fluid of the gauge, containing a glycerin/aqueous salt mixture, is poured onto the substrate at the hydrophilic layer 407. The fluid is then encapsulated with a polymer cover 409.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A strain gauge, comprising
   a polymer casing;
   a fluidic piezoresistive material made of a glycerin/aqueous salt mixture;
   metal tubes, metal conducting pads, or conductive polymer pads positioned on both ends of said polymer casing; and wherein the length between electrodes of said fluidic piezoresistive material is contained within said polymer casing.

2. The strain gauge of claim 1, wherein said glycerin/aqueous salt mixture comprises 0.5 to 1.5 parts salt, 7 to 10 parts water, and 2 to 4 parts glycerin.

3. The strain gauge of claim 2, wherein said salt is sodium chloride.

4. The strain gauge of claim 1, wherein water is distilled water, deionized water, or double distilled water.

5. The strain gauge of claim 1, wherein the gauge length of said polymer casing is between 15 mm to 30 mm in length.

6. The strain gauge of claim 1, wherein said polymer casing is made of an elastomer selected from the group consisting of an acylate, butyls, fluorocarbons, fluorosilicones, sulfides, urethanes, neopenes, isoprenes, nitrites, silicones, and butaldienes.

* * * * *